United States Patent [19]
Grantham et al.

[11] 3,807,424
[45] Apr. 30, 1974

[54] VALVE

[75] Inventors: Max Edward Grantham; Peter Charles Day, both of Plymouth, England

[73] Assignee: Tecalemit (Engineering) Limited, Plymouth, Devon, England

[22] Filed: Apr. 10, 1972

[21] Appl. No.: 242,306

[30] Foreign Application Priority Data
Apr. 15, 1971    Great Britain ..................... 9562/71

[52] U.S. Cl. ............... 137/106, 91/318, 137/624.13
[51] Int. Cl. ............................................ F01l 25/02
[58] Field of Search ...... 137/119, 524.13, 540, 553, 137/554, 596.12, 106; 91/308, 318

[56] References Cited
UNITED STATES PATENTS

| | | |
|---|---|---|
| 3,313,316 | 4/1967 | Thomas ..................... 137/596.12 X |
| 3,678,954 | 7/1972 | Ostwald et al. ................. 137/119 X |
| 2,537,680 | 1/1951 | Kupiec et al. ..................... 91/318 X |
| 3,550,617 | 12/1970 | Johnson .......................... 137/540 X |
| 2,969,806 | 1/1961 | Jensen et al. .................... 137/554 X |
| 430,089 | 6/1890 | Sewall ............................ 137/553 X |

Primary Examiner—Robert G. Nilson

[57] ABSTRACT

A two-line grease distribution system in which an automatic changeover valve passes grease to one of two lines alternately, both lines passing to a dispensing valve. The dispensing valve includes a piston member movable in a bore and valve means for connecting one line to the bore on one side of the piston whilst the bore on the other side of the piston is connected to a fluid outlet and vice versa. The automatic changeover valve is operated by variations of pressure in the system.

3 Claims, 13 Drawing Figures

PATENTED APR 30 1974 3,807,424

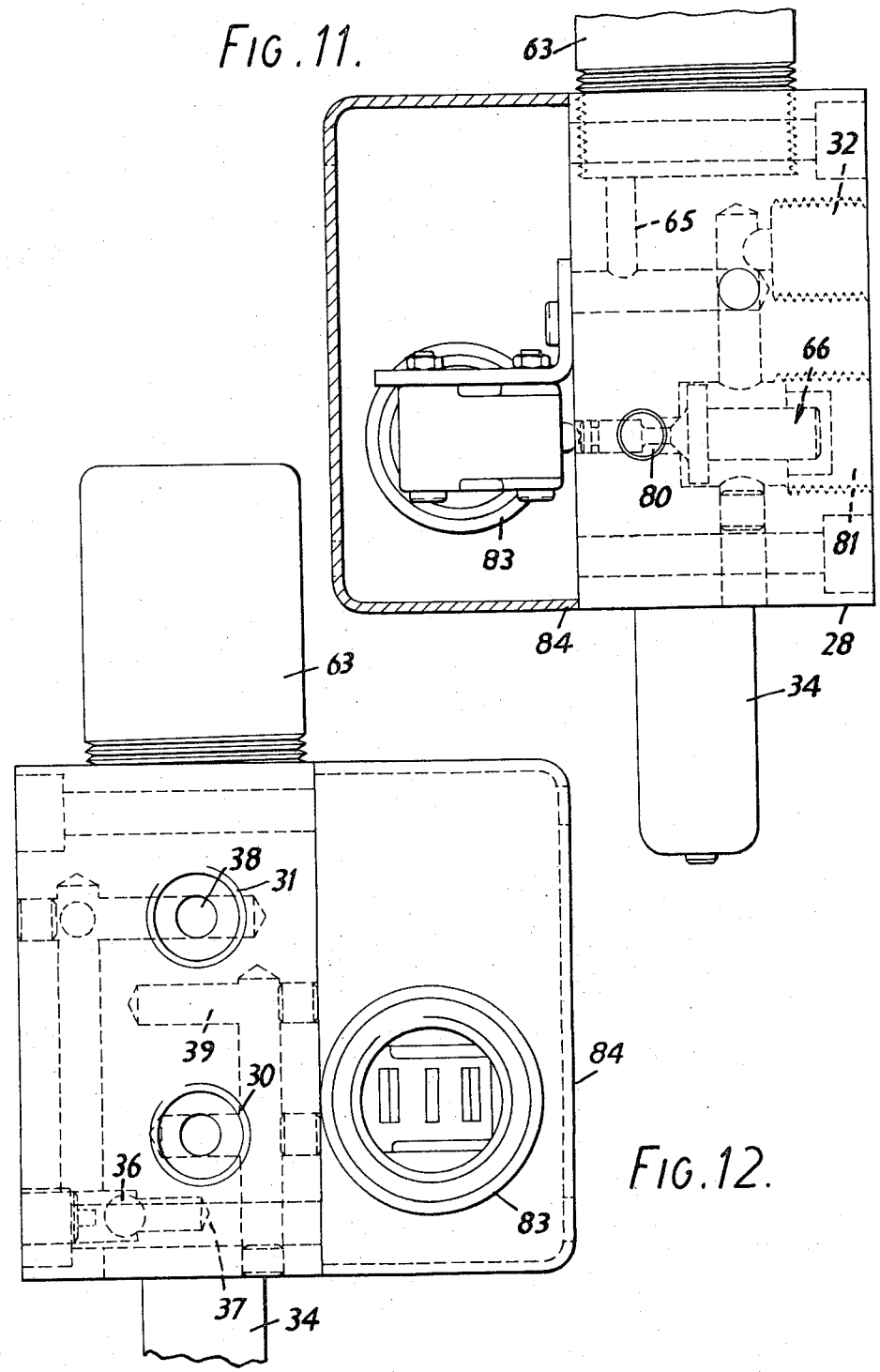

VALVE

BACKGROUND OF THE INVENTION

The present invention relates to a valve, which may connect a single inlet to one of a number of outlets, for example, two outlets. Such a changeover valve is particularly useful in a two-line grease distribution system in which lines from the two outlets pass to a dispensing valve. The dispensing valve usually includes a piston movable in a bore and valve means for connecting one line to the bore on one side of the piston whilst the bore on the other side of the piston is connected to a fluid outlet and vice versa.

Changeover valves normally employed are operated by, for example, timing or manual devices to change the outlet which is connected to the inlet. If a timing device is incorporated, the changeover valve is expensive and can be unreliable, and the manual version requires the presence of an operator.

SUMMARY OF THE INVENTION

It is an object of the invention to provide such a valve which overcomes or reduces these disadvantages.

Broadly the invention comprises an automatic change-over valve adapted to utilize pressure variations in the fluid system to which it is connected to operate the valve, that is to cause the valve to connect the inlet thereto alternately to one of several outlets.

Thus, if the valve inlet is connected to one of the outlets so that fluid may flow from the valve inlet to this outlet, whilst this one outlet is open, low pressure exists in the valve inlet, but when this one outlet is closed the pressure in the inlet rises and this can be used to operate means within the valve to switch fluid flow from this one outlet to another outlet.

The present invention provides a valve for connecting a fluid inlet to one of a plurality of outlets comprising an inlet, a plurality of outlets, and a valve member movable to different positions, each position causing the inlet to be connected to an associated one of the outlets, said valve member being movable to these positions in response to pressure variations in the inlet. Preferably the valve member is movable bp the pressure variations in the inlet against a biassing member. The valve may include a relief valve arranged to open the inlet to an exhaust when the pressure in the inlet exceeds a predetermined pressure. Thus, in use, when the inlet is connected to a pressure source capable of providing fluid at a pressure greater than said predetermined pressure, the valve member cycles from a first position through a series of positions, one for each outlet and then returns to the first position. In use, the valve member, in this first position (which corresponds to a first inlet pressure ) causes communication between the inlet and a first outlet until the first outlet is closed whence the inlet pressure rises to a second value which moves the valve member to a second position until it causes communication between the inlet and a second outlet. This continues until all of the outlets have been connected in turn to the inlet. When the last outlet closes the inlet pressure rises above the predetermined pressure to cause the relief valve to open the inlet to exhaust, the drop in inlet pressure causing the valve member to return to the first position and the relief valve to close.

The changeover valve preferably includes only two outlets.

The relief valve, once opened by a pressure greater than said predetermined pressure may be arranged to remain open at pressures below the predetermined pressure. The relief valve may comprise a valve member which is spring biassed to close the relief valve against the pressure at the inlet. The relative areas of the parts of the relief valve member which are acted upon by pressure from the inlet may be arranged such that the relief valve member opens at the predetermined pressure but remains open, and does not close until the pressure on the inlet has dropped to a sufficiently low value to allow the valve member of the changeover valve to return to the first position. At that point, the valve is once again open to the first outlet and the relief valve closes.

In particular the relief valve member may comprise a valve portion for closing an aperture through which fluid may flow and a further valve portion of greater diameter than said aperture to which fluid pressure is applied when the relief valve is open. Preferably, said valve portion of said relief valve comprises a conical end portion of said relief valve member. Preferably, said relief valve member is mounted within a valve chamber and said further valve portion of said relief valve comprises a plate member which is a close fit within said valve chamber.

Said valve portion of said relief valve member may extend through said aperture and into a bore in the wall of the valve. Conveniently, the extended part of said valve portion of the relief valve member operates a microswitch connected in an electrical circuit to indicate whether the relief valve is open or closed.

The valve member of the changeover valve may be arranged so that when the inlet is in communication with any one of the outlets, the other outlets are in communication with the exhaust.

Preferably the valve member comprises a spool movable in a bore in the valve body, said bore including ports communicating therewith and said spool including portions of a diameter smaller than said bore between portions of the spool of the same diameter as the bore. In this case there may be provided five of said ports spaced along the bore in order, the first port connected to a first outlet, the second port connected to an exhaust, the third port connected to a second outlet, the fourth port connected to the inlet, and the fifth port connected to the first outlet via a non-return valve, and the spool may include three portions of the same diameter as the bore.

Preferably, the part of the bore between the fourth and fifth ports is of a narrower diameter, a first of the three portions of the same diameter as the bore being situated in this narrower part of the bore the second portion being situated adjacent the fourth port, the fourth port extending along the length of the bore sufficient to straddle the second portion and the third portion being situated adjacent the second port so that the force causing the spool to move is provided by the pressure at the inlet acting on an area equal to the difference in cross-sectional area of the bore at its narrower part and the remainder. The non-return valve is preferably a spring loaded ball valve.

Preferably another portion of said spool of the same diameter as the bore is provided on said spool adjacent one end to prevent leakage of fluid from said bore at that end.

Conveniently an indicator is connected to the spool and extends outside the valve body to indicate the position of the spool.

The invention also provides a two line fluid distribution system comprising a pump for providing fluid at a pressure at the inlet of a valve as aforesaid, there being provided two outlets of the valve, each outlet being connected to a separate line and each line being connected to at least one dispensing valve, each dispensing valve including a piston member movable between the ends of a bore and valve means for connecting one line to the bore on one side of the piston whilst the bore on the other side of the piston is connected to a fluid outlet and vice versa.

A two line lubricant distribution system incorporating an automatic change-over valve embodying the invention and an alternative automatic change-over valve, will now be described by way of example only, and with reference to the accompanying drawings in which.

Figure 9:
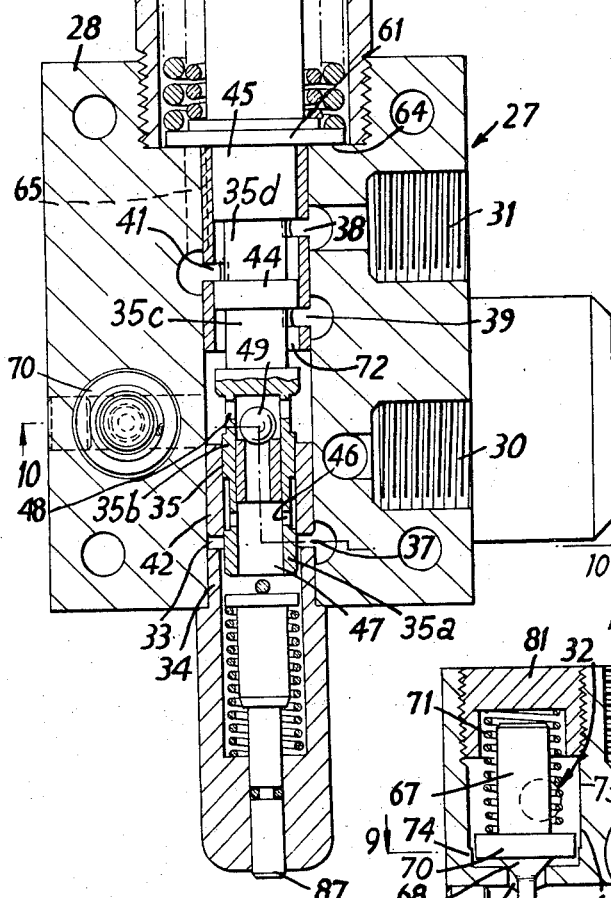
Figure 10:
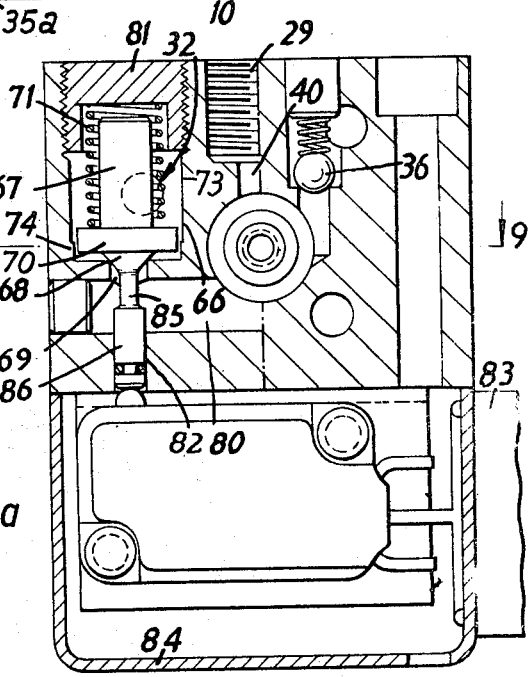
Figure 10A:
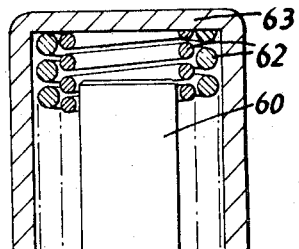

FIGS. 4 to 8 are diagrammatic cross-sections through a changeover valve incorporating the invention, the various Figures showing the disposition of the various parts of the valve during the course of operation of the valve, FIG. 9 is a vertical sectional view of an alternative changeover valve on line 9 — 9 of FIG. 10, FIG. 10 is a sectional view of the valve of FIG. 9, on the line 10 — 10, and FIG. 10a shows a detail of FIG. 10.

FIGS. 11 and 12 are opposite side views of the changeover valve of FIG. 9, with the internal conduits shown in dotted lines.

Figure 1:
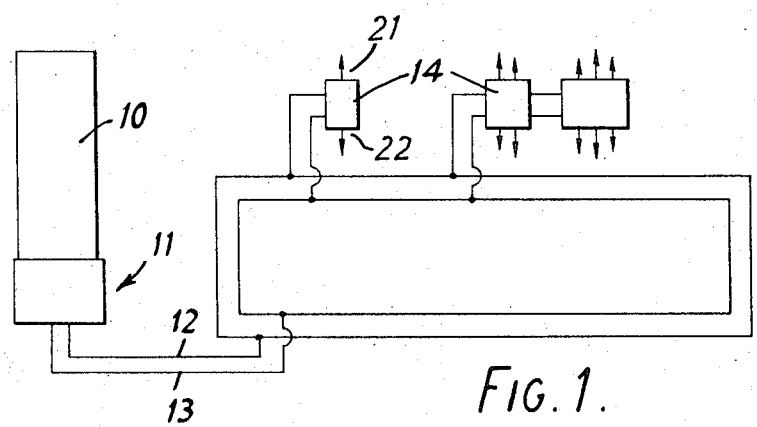
FIG. 1 is a diagrammatic view of the two line lubricant distribution system.

The two line lubricant distribution system illustrated in FIG. 1 includes a pump 10 for supplying, for example, grease under pressure to a changeover valve system 11, and two lines 12, 13 for carrying grease from the changeover valve system 11, and various dispensing valves 14 disposed between the two lines 12, 13. The dispensing valves 14 dispense the grease to the lubricating point as required.

The dispensing valves 14 (FIGS. 2 & 3) each comprise a valve body 15 including bores 16, 17. The larger bore 16 includes a main piston 18 slidable within the bore and the smaller bore 17 includes a spool 19. The bore 17 includes four ports 20, 21, 22, 23. Port 20 which is adjacent one end of the bore 17 is connected to input line 12, and port 23 which is adjacent the opposite end of the bore 17 is connected to input line 13.

Ports 21, 22 are connected to the points which are to be supplied with grease under pressure and may either be connected to the same grease points or to two separate points. Attached to the main piston 18 is an indicator 24 comprising a rod protruding through a seal in the valve body 15, the length of the protruding part of the rod 24 indicating the position of the main piston 18 in the main bore 16.

Figure 2:
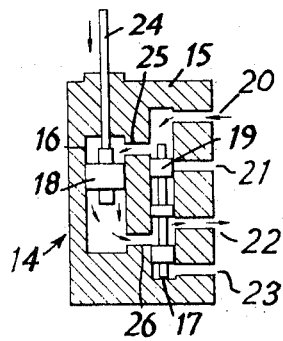
FIG. 2 is a diagrammatic view of a dispensing valve in a first position.

Before describing the construction and operation of the automatic changeover valve 27 which is incorporated in the changeover valve system 11, the mode of operation of the two line grease distribution system will be described. The pump 10 provides grease at high pressure to the changeover valve system 11 which alternately connects the pump to the lines 12 or 13. When the grease under pressure is applied to line 12 the grease passes to the dispensing valves. Thus, in each dispensing valve 14 grease passes through inlet port 20 and moves spool 19 downwardly. When the spool 19 is in its lowermost position as indicated in FIG. 2, the outlet port 21 is cut off by the spool 19. With the spool 19 in this position grease can pass from the inlet port 20 via a port 25 interconnecting the upper part of bore 16 and the upper part of bore 17 to the upper part of the bore 16 which thereby moves piston 18 downwardly. When the main piston 18 reaches its lowermost position it is restrained from further movement and this creates a back pressure in line 12. It will be appreciated that the part of the bore 16 above the main piston 18 is then full of grease. At this point the changeover valve system 11 disconnects pump 10 from line 12 and connects the pump to line 13. This causes grease to be applied through inlet port 23 of each dispensing valve 14 and the spool 19, which is of much smaller diameter than the main piston 18 rapidly moves to its uppermost position. In this uppermost position the spool interconnects the upper part of the bore 16 above the main piston 18 via the interconnecting port 25 with the outlet port 21. As more grease enters the inlet port 23 the grease passes via port 26 which intercommunicates the lower parts of bores 16 and 17 into the part of the bore 16 below the main piston 18 and this forces the main piston 18 upwardly. As the part of the bore 16 above the main piston 18 is full of grease, this upward movement of the piston 18 causes the grease to pass out of the outlet 21 to the lubricant outlet under pressure, this pressure being the pressure applied to line 13. This continues until the main piston reaches the upper limit of its travel where it is arrested and this causes a back pressure through inlet port 23 to line 13. The changeover valve system 11 then disconnects the pump from line 13 and reconnects it to line 12 and grease is then applied under pressure to inlet 20 which moves the valve spool 19 downwardly and the cycle is repeated.

It will thus be seen that at any one time grease being applied to the dispensing valves 14 along lines 12 or 13 is being used to pump grease which has previously been fed to these valves along lines 13 or 12 respectively into lubricant outlets. Thus pressure to line 12 moves main piston 18 downwardly to pump grease via interconnecting bore 26 to outlet port 22 and grease applied to inlet port 23 via line 13 moves main piston 18 upwardly to pump grease via interconnecting bore 25 to outlet 21.

The indicator rod 24, by its position, indicates whether the main piston is moving up or down and hence to which outlet 21 or 22 grease is being applied at any one time.

The construction and operation of the automatic changeover valve 27 will now be described in detail with particular reference to FIGS. 4 to 8. The valve body 28 includes an inlet 29 from the pump, which pump must be capable of producing a pressure at the inlet 29 greater than a predetermined pressure. The valve body 28 further includes two outlets 30, 31, the outlet 30 being connected to line 12 and the outlet 31 being connected to line 13. An exhaust port 32 is provided which may be connected to a reservoir from which the pump 10 draws its supply of grease.

The valve body 28 includes a bore 33 closed at one end by a plug 34. A sleeve 42 comprising an upper and a lower sleeve fits within the bore 33 and is rigidly connected therein. Within a bore 72 formed by the sleeve 42 is slidably mounted a valve member in the form of a spool 35. The outlet 31 communicates with the bore 72 by a port 37 at a point adjacent the plug 34 via a non-return valve 36 which prevents the return of grease from the outlet 31 back to the bore 72. The outlet 31 also communicates directly with the upper end (in FIGS. 4 to 8) of the bore 72 by means of a port 38 in sleeve 42. The other outlet 30 communicates directly with the bore 72 by means of a port 39 in sleeve 42 situated intermediate ports 37 and 38. The inlet 29 communicates directly with the bore 72 by a port 40 formed by the gap between the upper and lower sleeves which is intermediate the ports 37 and 39. The exhaust port 32 communicates directly with the bore 72 by a port 41 formed in sleeve 42 intermediate the ports 38 and 39.

The sleeve 42 is not of constant diameter throughout but the inner diameter of the lower part of the cylindrical bore 72 formed by the sleeve (between the ports 37 and 40) is smaller.

The spool 35 also includes sections of differing diameters.

The diameter of the lower portions 35a and 35b of the spool are the same as the diameter of the lower part of the bore 72 between ports 37 and 40. The upper part of the spool (i.e., that above port 40 in FIG. 4) is of slightly smaller diameter than the lower part. There are, however, provided three collars 43, 44 and 45 of larger diameter, that is, the same diameter as the part of the upper part of the bore 72 between the ports 40 and 38 the narrower portions between these collars being numbered 35c and 35d. The collar 43 is provided on the spool in that region of the spool which is adjacent port 40, the collar 44 is provided on that part of the spool which is approximately adjacent port 41 and the collar 45 is provided on the spool 35 beyond the port 38 and acts as a seal to prevent or reduce grease from bore 72 upwardly passing out of the bore 72. The collars 43 and 44 act as obturators as will be described more fully hereafter.

The bottom part of the spool 35 includes, intermediate portions 35a and 35b of the spool 35, a portion 46 of reduced diameter. A bore 47 in the spool 35 provides communication between this portion 46 of reduced diameter and the part of the bore 33 beyond the lower end of the spool 35 and hence with the port 37. The bottom portion of the spool 35 also includes a further bore 48 which provides communication between the surface of the spool 35 adjacent port 40 and the bore 47. A non-return valve 49 is provided in this bore 48 to allow grease to flow from the bore 47 back to the port 40.

It will be noticed that the spool 35 is not in one part, the bottom section, that is the section below the collar 43 being connected to the remainder by a pin joint 50 which allows the bottom part of the spool and the top part of the spool to be slightly misaligned to take up any misalignment between the axes of the top and bottom of the sleeve 42 caused during manufacture.

The spool 35 extends beyond the port 38 and sleeve 42 out of the valve body 28. This protruding section 60 of the spool 35 includes an integral annular flange 61. Double coil springs 62 act between this annular flange 61 and the underside of a cap 63 extending from and screwed into the valve body 28 to bias the spool 35 in a downward direction, that is, towards the position shown in FIG. 4. The downward movement of the spool is limited by abutment of the annular flange 61 on a stop member provided by a face 64 of the valve body 28.

Although as mentioned above the collar 45 is intended to prevent grease from flowing from the bore 72 some grease will inevitably collect in the cap 63 from the bore 33 in the course of time and a bore 65 is provided in the valve body 28 to intercommunicate the inside of the cap 63 and the exhaust port 32.

The inlet 29 and the exhaust port 32 of the valve body 28 are intercommunicated by a relief valve which comprises a non-return valve 66. This non-return relief valve 66 is arranged so as to prevent flow of grease from the exhaust port 32 to the inlet 29. The relief valve 66 comprises a valve member 67 having a generally conical end portion 68 which engages a port 69 in the inlet 29, the diameter of the port 69 being less than the maximum diameter of the conical end portion 68. The conical end portion 68 of the valve member is backed by an annular flange 70 of greater diameter than the maximum diameter of the conical end portion 68. The remainder of the valve member 67 is of a smaller diameter than this annular flange 70. A coil spring 71 acts between the face of the annular flange 70 opposite the conical end portion 68 and a remote face of the bore within which the valve member 67 is situated, this remote face being spaced from the end of the valve member 67 opposite the conical end portion 68. This opposite end of the valve member 67 is situated adjacent the exhaust port 32.

Figure 4:
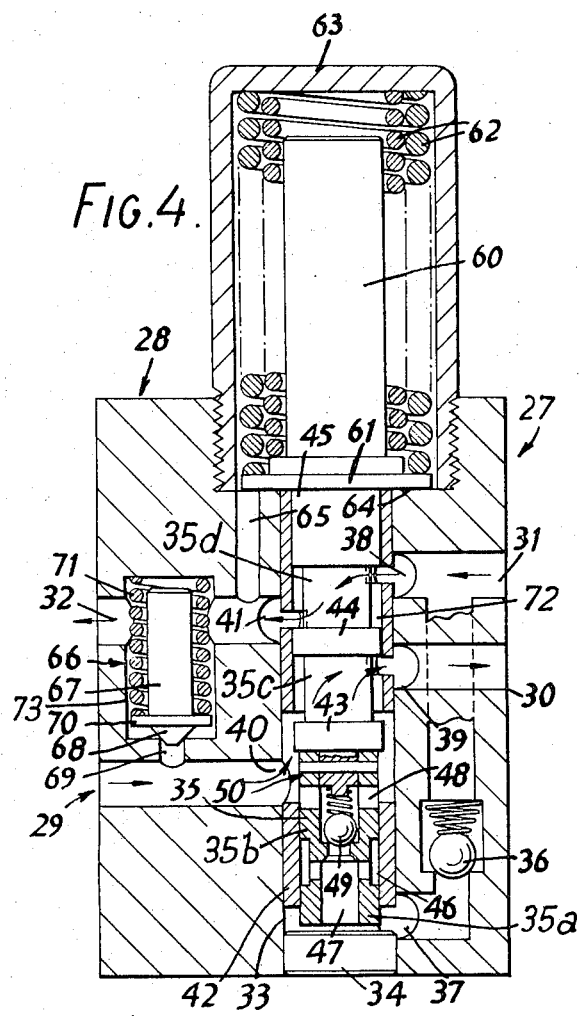
Figure 5:
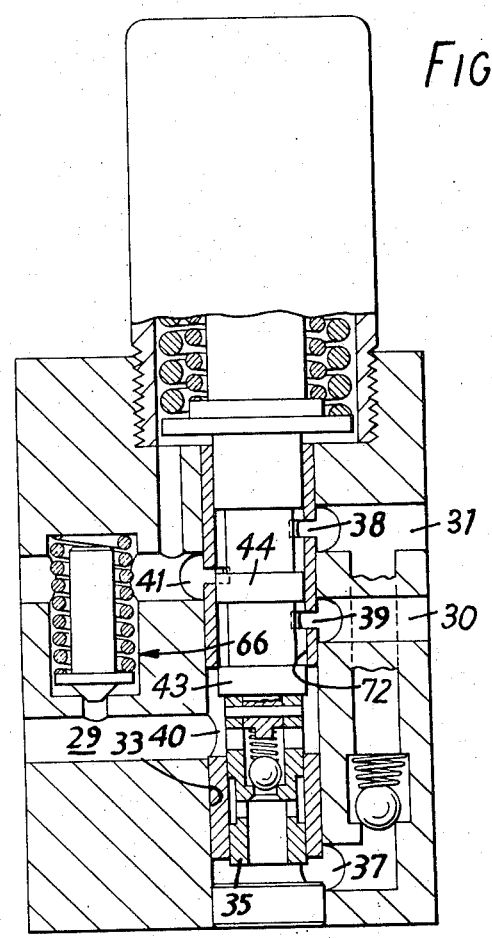
Figure 6:
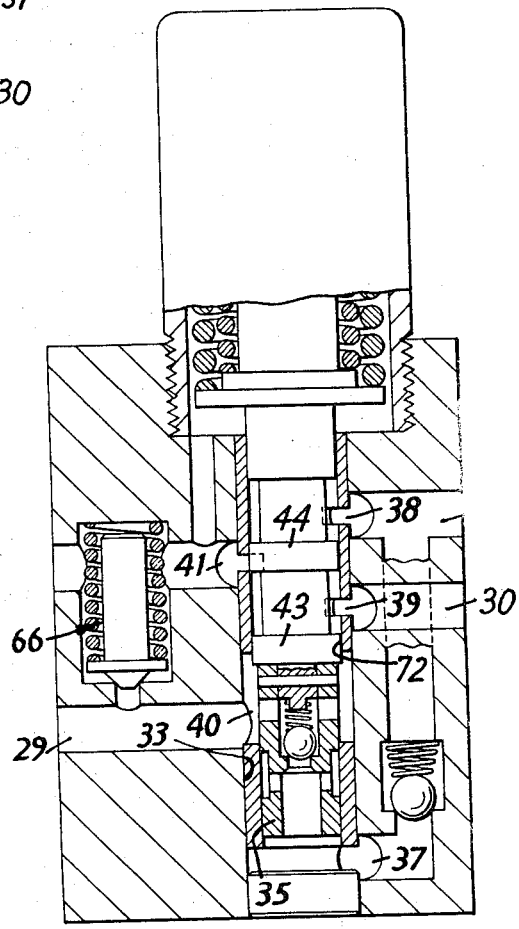
Figure 7:
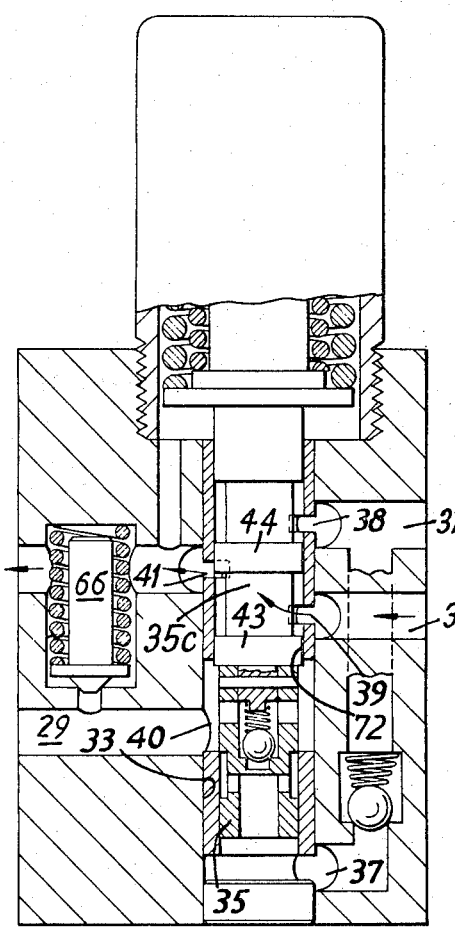
Figure 8:
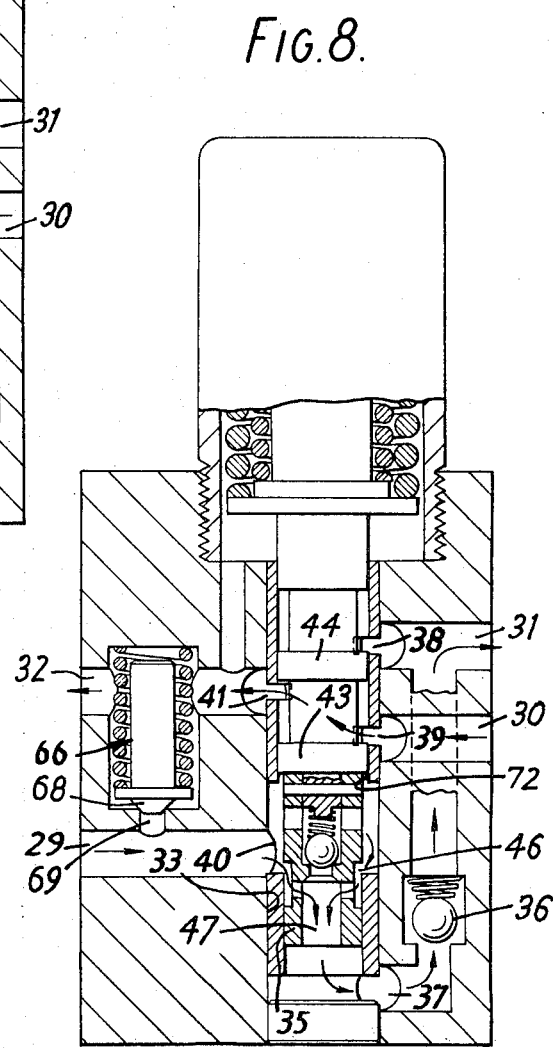

The automatic changeover valve operates in the following manner to alternately connect the inlet to one of the two outlets. When the main piston 18 in the dispensing valves 14 are in the position shown in FIG. 2, grease must be supplied along line 12 and the automatic changeover valve 27 will be in a first position as shown in FIG. 4. Grease is supplied from the pump 10 under pressure to the inlet 29. The valve member 35 is in its lowermost position, that is, the annular flange 61 is abutting the face 64. The collar 43 is bridged by the port 40 through which grease is supplied from the inlet 29 and the grease passes around the collar 43 and around the part of the spool 35c between the collars 43 and 44 and out of the port 39 which is below collar 44. Grease passes from the port 39 via outlet 30 to line 12. It will be noted that the portion 46 of reduced diameter is wholly situated within the sleeve 42 so that no grease can pass from the outlet 40 to the bore 47. It will also be noted that the port 38 is not obstructed by collar 44, nor is the port 41 and thus the two ports 38 and 41 are intercommunicated by the space around the spool 35 to allow grease to back flow from the line 31 to the exhaust 32. This is necessary since the initial effect of applying grease to line 12 after it has been applied to line 13 is to move the spool 19 in the dispensing valve 14 and this will cause a slight back flow of grease from line 13 which must be allowed to escape to exhaust. The pressure of the grease in the inlet 29 at this time is relatively low as grease is freely flowing into the upper portion of the bore 16 above the main piston 18 of each distributing valve and thus the relief valve 66 remains closed. The coil springs 62 are preloaded so that this relatively low pressure is not sufficient to cause the spool 35 to move upwardly against the coil springs 62 as will be more clearly described hereafter.

Figure 3:
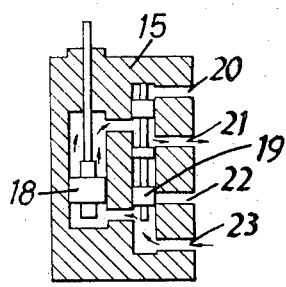
FIG. 3 shows the dispensing valve of FIG. 2 in a second position.

When the main pistons 18 of the distributing valves 14 reach their lower limit of travel, (as seen in FIGS. 2 and 3) that is, the part of the bore 16 above the main piston 18 is full of grease, no further grease will pass along the line 12 and the pressure in the inlet 29 will therefore rise. This increase in pressure causes the spool 35 to lift against the bias of springs 62. The reason for this can be clearly seen from the drawing. The pressure at the inlet 29 acts on the following transverse surfaces of the spool 35; the underside of the collar 44, the upper side and the lower side of the collar 43. As the collars 43 and 44 are the same diameter and the portion 35c between the two of them is of reduced diameter then the upward force on the underside of the collar 44 and the downward force on the upper side of the collar 43 cancel out. Thus the effective net force acting on the spool 35 is the grease pressure acting on the underside of the collar 43 and this is arranged to be sufficient when the main piston 18 reaches the lowermost position to lift the spool against the force of the coil springs 62. The area of the underside of the collar 43 is the same as the difference in cross sectional area of the upper and lower parts of the sleeve 42. It will be appreciated that, ignoring lag, there will be a given position of the spool for each value of the inlet pressure as it rises towards the predetermined pressure and reaches the position shown in FIG. 5. At this point the collar 43 enters the upper part of the sleeve 42 so that communication between the port 40 and the port 39 is cut off. The inlet pressure continues to rise and thus the spool continues to move upwardly since although the inlet pressure is not now supplied to the underside of the collar 44 and the upper side of the collar 43, it is still directed at the underside of the collar 43. The spool continues to move upwardly until it reaches the position shown in FIG. 6. At this point the port 41 is closed by the collar 44 and so the line 13 is sealed from the exhaust port 32 prior to grease at pressure being applied to line 13. The closing of port 41 and the cutting of communication between port 40 and 39 may alternatively be arranged to occur simultaneously. The spool continues to lift through the position shown in FIG. 7. At this point, the collar 44 has risen beyond port 41 thereby preventing communication between ports 38 and 41 but communication is provided between the port 39 and 41 via the reduced diameter portion 35c of the spool 35 between collars 43 and 44. This allows the pressure in line 12 to be released so that when pressure is applied to line 13 and the spool 19 in the dispensing valve 14 moves upwardly the small amount of grease above the spool 19 in the bore 17 is allowed to exit to exhaust via ports 39 and 41.

The spool 35 continues to rise with the increase in inlet pressure since the pressure in the inlet is still acting on the underside of collar 43 and there is no other force acting on the spool apart from the springs 62. The spool then reaches the position shown in FIG. 8. In this position, the second position, the portion 46 of reduced diameter communicates with the port 40 and grease is thus allowed to pass from the inlet 29 via this reduced portion 46, the bore 47, the port 37, the non-return valve 36, to the outlet 31 and hence to line 13. As the non-return valve 36 is a spring loaded ball valve, it will create a back-pressure at the inlet as it requires pressure to open the ball valve 36. This back-pressure is chosen, by choosing the spring rate of the spring in the valve 36 to be a value which will retain the spool 35 in a position in which reduced portion 46 communicates with port 40.

The spool 35 remains in this position whilst the main piston 18 rises in the bore 16 as grease is being provided to the part of the bore 16 below the piston and the grease which is already situated in the part of the bore above the piston is being supplied to the grease points via port 41. When the main piston 18 reaches the upper limit of its travel, and no further grease can be supplied along line 13, the pressure on the inlet 29 then rises further. This would move the spool further upwards but this further upward movement is limited by abutment of the top of the protruding section 60 of the spool against the underside of the cap 63.

Pressure at the inlet 29 continues to rise to the predetermined value. At this predetermined value the pressure acting on the part of the conical end portion 68 of the relief valve 66 which is in communication with the inlet 29 via the port 69 is sufficient to overcome the closing force of the coil spring 71. The relief valve 66 thus opens to allow the pressure at the inlet to be exhausted. This happens very rapidly and since no pressure is now provided to retain the spool in its uppermost position, the spool 35 rapidly returns from its uppermost position to the position shown in FIG. 4 under the action of the coil springs 69.

It will be noted that the relief valve remains open, once opened until the valve spool 35 returns to its lowermost position despite the fact that the pressure in the inlet 29 drops. The reason for this is that the pressure required to open the relief valve 66 is much higher than the pressure required to retain it open once it is opened since the area over which the inlet pressure acts when the valve is closed is the area of the bore 69; however, once the relief valve 66 is open and the valve member 67 is raised, this inlet pressure operates over the whole of the area of the conical end portion 68 and the end face of the annular flange 70. It does not act over the back surface of the annular flange 70 since as the annular flange 70 is a close fit within the valve chamber 73 there is a pressure drop across the flange 70 and the pressure on the back face of flange 70 is exhaust pressure. It is arranged such that the inlet pressure required to open the valve is sufficient to lift the spool 35 beyond the position shown in FIG. 8 and the inlet pressure required to keep the relief valve open once opened is arranged to be less than the force required to lift the spool 35 from its lowermost position. (The pressure acting on the top of the valve member 67 can be ignored since this is at exhaust pressure, that is, usually approximately zero).

It will be appreciated that the spool 35 in returning from its uppermost position to the position shown in FIG. 4 will pass through the position shown in FIGS. 8, 7, 6 and 5 respectively, the difference being that the relief valve 66 is open.

The non-return valve 36 prevents the pressure in line 13 applied through port 37 from interfering with the downward motion of the spool 35. It will be appreciated also that the grease which is present below the spool 35 when it is in its uppermost position is allowed to escape back to the inlet 29 and hence to exhaust through relief valve 66 via the non-return valve 49.

Once the spool 35 reaches the position shown in FIG. 4 it will be appreciated that there is passage of grease from line 13 due to the movement of the spool 19 in the distributing valve and the pressure of the grease passing to exhaust applied to the rear face of flange 70 together with the drop in the inlet pressure when the grease passes to line 12 which is now open and therefore at approximately zero pressure will ensure that the relief valve 66 closes.

Once the spool 35 reaches the position shown in FIG. 4 the cycle can recommence.

It will be appreciated that the operation of this changeover valve 27 is completely automatic being controlled by pressure variations in the inlet in response to pressure changes in the outlets. If a pressure source is provided having a maximim pressure greater than the predetermined pressure, that is, sufficient to lift the spool beyond the position in which it allows grease to pass from the inlet 29 to the outlet 31 and also being of a pressure sufficient to allow opening of the relief valve 66, the two line greasing system can be allowed to operate by itself completely automatically.

It will be understood that the system may also be used for distributing lubricating oil.

It will be appreciated that the automatic changeover valve 27 shown in FIGS. 4 to 8 is diagrammatic. FIGS. 9 to 12 show a practical embodiment of the changeover valve 27. It will be seen that similar parts in FIGS. 4 to 8 and FIGS. 9 to 12 carry the same reference numerals.

One major difference between the two embodiments is that the spool 35 in the embodiment of FIGS. 9 to 12 is in one piece and no pin 50 is provided.

Another change is that in FIGS. 9 to 12 the relief valve 66 is arranged differently. As before the relief valve 66 is arranged so as to prevent flow of grease from the exhaust port 32 to the inlet 29. It will be seen that in this embodiment the relief valve 66 is connected to the inlet 29 via the port 40. The relief valve 66 comprises a valve member 67 having a generally conical end portion 68 which engages the port 69 in a bore 80 connected to the port 40 and hence the inlet 29. As before, the diameter of the port 69 is less than the maximum diameter of the conical end portion 68 and the conical end portion 68 is backed by an annular flange 70 of greater diameter than the maximim diameter of the conical end portion 68 which is a close fit within valve chamber 73. Situated on the opposite side of the annular flange 70 from the conical end portion 68 is a further cylindrical part 67 of smaller diameter than the annular flange 70. A coil spring 71 acts between the face of the annular flange 70 opposite to the conical end portion 68 and a remote face of the bore within which the valve member 67 is situated, this remote face being provided by a plug member 81 and being spaced from the end of the valve member 67 opposite the conical end portion 68. The exhaust port 32 communicates with this bore. The conical end portion 68 is extended across the bore 80 and this extended part 86 sealingly engages a bore 82 in the opposite wall of the bore 80. The bore 82 extends to the outer surface of the valve body 28. The extended part 86 of the conical end portion 68 is necked (that is, of narrower diameter). A micro switch 83 is mounted on a housing 84 attached to the side of the valve body 28, the operating part of the micro switch 83 entering the bore 82 to contact the extended part 86 of the conical end portion 68.

The mode of operation of the relief valve 66 is the same as before except that the micro switch 83 is operated by movement of the valve member of the valve 66. It will be noted that the force acting on the relief valve is the inlet pressure acting on a net area which comprises the difference between the cross-sectional areas of ports 69 and 82. This, together with the narrow neck 85 allows the flow of grease through the port 66 when valve is opened to be unrestricted. Further, it will be noted that the wall of the valve chamber 73 is restricted as its lower end by a portion 74 of lesser diameter (see FIG. 10a), so that, once the valve is opened and the flange 70 moves up the valve chamber 73 against the springs 32, there is a less restricted flow for the grease past the flange 70 as the distance between the flange 70 and the wall of the valve chamber 73 increases. This allows a farily unrestricted flow for grease from the pump to the exhaust.

The micro switch may be used to indicate the end of a cycle of operation of a valve which may be used, for example to switch off a supply of electricity to the grease pump if a timed system is used.

A further change in the changeover valve of FIGS. 9 to 12 is that an indicator is connected to the end of the spool 35 remote from the cap 63. This indicator comprises an extension part 87 extending, in sealing engagement, through the plug 34. This can be used to indicate the position of the spool in the valve and hence the point of the cycle of operations of the valve at any one time.

We claim:

1. A valve for connecting a fluid inlet to one of a plurality of outlets comprising a valve body defining a bore in communication with an inlet, and a plurality of outlets, a valve member comprising a spool in said bore movable to different positions, each position causing the inlet to be connected to an associated one of the outlets, said valve member including means responsive to an increased pressure in the inlet to move the valve member to said different positions in succession, means defining ports in said bore in communication with portions of said spool being of a diameter smaller than said bore and being arranged between portions of the spool of the same diameter as said bore, said spool including at least three portions of the same diameter as said bore, at least five of said ports spaced along the bore in order, a first port connected to a first outlet, a second port connected to an exhaust passage, a third port connected to a second outlet, and a fourth port connected to said inlet, and a fifth port connected to said first outlet, a non-return valve in communication between said fifth port and said first outlet, and means to reduce the pressure in said inlet to a level below said increased pressure when the pressure exceeds a predetermined pressure higher than said increased pressure.

2. A valve as claimed in claim 1 in which the part of the bore between the fourth and fifth ports is of a narrower diameter, a first of the three portions of the same diameter as the bore, being situated in this narrower part of the bore the second portion being situated adjacent the fourth port, the fourth port extending along the length of the bore sufficient to straddle the second portion and the third portion being situated adjacent the second port.

3. A valve as claimed in claim 1 in which said non-return valve comprises a spring-loaded ball valve.

* * * * *